United States Patent [19]

Hamada et al.

[11] 4,126,589

[45] Nov. 21, 1978

[54] METHOD FOR PREPARATION OF CATION EXCHANGE MEMBRANES

[75] Inventors: Masato Hamada, Yokohama; Maomi Seko; Yasumichi Yamakoshi, both of Tokyo; Hirotsugu Miyauchi; Fumihiko Yamamoto, both of Kawasaki, all of Japan

[73] Assignee: Asahi Kasei Kogyo Kabushiki Kaisha, Osaka, Japan

[21] Appl. No.: 851,481

[22] Filed: Nov. 14, 1977

[30] Foreign Application Priority Data

Nov. 15, 1976 [JP] Japan .................................. 51/136244

[51] Int. Cl.$^2$ .............................................. B01D 3/00
[52] U.S. Cl. ......................................... 521/31; 526/18; 526/52.1; 526/243
[58] Field of Search .................... 260/2.2 R, 79.3 MU

[56] References Cited

U.S. PATENT DOCUMENTS 3,969,285  7/1976  Grot ................................... 260/2.2 R

OTHER PUBLICATIONS

Journal of the American Chem. Society, 89 5311 (1967) Ji, et al., 5311–5312.

Primary Examiner—Joseph L. Schofer
Assistant Examiner—Peter F. Kulkosky
Attorney, Agent, or Firm—Cooper, Dunham, Clark, Griffin & Moran

[57] ABSTRACT

A fluorocarbon polymer membrane having pendant sulfonamide groups is first treated with anion radicals and then hydrolyzed for conversion into a cation exchange membrane having carboxylic groups and sulfonic acid groups.

4 Claims, No Drawings

IMPROVED METHOD FOR PREPARATION OF CATION EXCHANGE MEMBRANES

This invention relates to improved methods for preparation of cation exchange membranes.

Cation exchange membranes comprising perfluorocarbon polymers having pendant sulfonamide groups, produced by treatment of the surface of a membrane comprising a copolymer of tetrafluoroethylene and perfluoro-3,6-dioxa-4-methyl-7-octene sulfonyl fluoride with ammonia, are known. They are used as membranes for electrolysis of aqueous alkali metal halide solutions, as disclosed by U.S. Pat. No. 3,784,399. Such cation exchange membranes having sulfonic acid groups and sulfonamide groups, however, are not satisfactory in membrane durability although improved in current efficiency compared with membranes having only sulfonic acid groups. In order to overcome such drawbacks, novel membranes containing both sulfonic acid groups and carboxylic acid groups have been proposed, as disclosed by U.S. patent application Serial No. 701515 (filed on July 1, 1976).

According to the present invention, there are provided methods for preparation of perfluorocarbon cation exchange membranes having carboxylic acid groups, which comprises first subjecting membranes of a perfluorocarbon polymer having groups of the formula —CF$_2$CF$_2$SO$_2$NH$_2$ as the pendant groups or a part of the pendant groups to anion radical treatment, and then hydrolyzing the thus treated products. More specifically, according to the present methods, perfluorocarbon cation exchange membranes are produced by treating membranes composed of perfluorocarbon polymers having at least some pendant groups of the formula —CF$_2$CF$_2$SO$_2$NH$_2$ with a compound which generates anion radicals such as Na-naphthalene, Na-benzene, Na-styrene and the like or a mixture thereof and hydrolyzing the thus treated membranes with a conventional acid or alkali.

In the present invention, cation exchange membranes containing sulfonic acid and carboxylic acid groups are preferably produced with a structure such that carboxylic acid groups may be present on the surface of the membrane as stratum with thickness of at least 100 A, preferably only on the cathode side, the pendant groups at portions other than said surface on the cathode side being preponderantly sulfonic acid groups which may optionally be copresent with carboxylic groups. The thickness of the stratum in which carboxylic acid groups are present is generally selected so as to increase current efficiency of the membrane, while decreasing electric consumption during electrolysis to as low a level as possible by reducing the electric resistance of the membrane as much as possible. The thickness, however, is preferably 100 A or more.

The position at which the stratum containing carboxylic acid groups is located in the membrane and the thickness of said stratum are preferably controlled by regulating the position and the thickness of the polymer stratum containing sulfonamide groups. For example, according to the method according to U.S. Pat. No. 3,784,399, a membrane of a polymer having —CF$_2$CF$_2$SO$_2$F groups may be formed into a shape of a bag and then the bag is contacted with ammonia for a predetermined time, whereby a stratum with a predetermined thickness containing —CF$_2$CF$_2$SO$_2$NH$_2$ groups can be formed on the surface of the membrane.

Perfluorocarbon polymers having pendant sulfonamide groups for use in the present invention are obtained by reacting perfluorocarbon polymers having pendant —CF$_2$CF$_2$SO$_2$F groups with ammonia. The polymers having pendant —CF$_2$CF$_2$SO$_2$F groups are prepared by copolymerizing a fluorinated ethylene with a fluorocarbon vinyl ether having sulfonylfluoride groups of the formula:

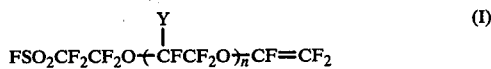　　　(I)

(wherein Y represents fluorine, perfluoromethoxy perfluoromethylene or a perfluoroalkyl group with 2 to 5 carbon atoms, and $n$ an integer of 0 to 3), optionally together with hexafluoropropylene CF$_3$CF=CF$_2$ and a monomer selected from the group consisting of the monomers represented by the formula:

　　　(II)

(wherein $p$ is an integer of 1 to 3 and $m$ an integer of 0 to 2).

Typical fluorinated ethylene for use in the invention includes vinylidene fluoride, tetrafluoroethylene, chlorofluoroethylene and the like.

Typical examples of useful fluorocarbon vinyl ethers having sulfonyl fluoride groups the represented by formula (I) above, and by the formulas set forth below:

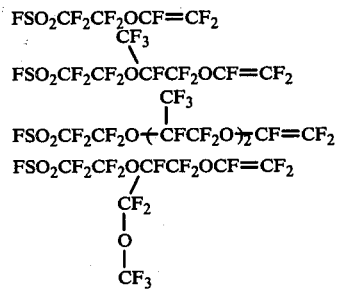

The most suitable sulfonyl fluoride containing monomer is perfluoro(3,6-dioxa-4-methyl-7-octene sulfonyl fluoride), having the formula:

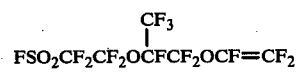

A typical fluorovinylether which may be copolymerized, if desired, as represented by the formula (II) is perfluoromethyl vinyl ether.

Copolymers which may be used for preparation of membranes of the invention are suitably made from perfluorocarbon compounds, but other copolymers can be used so long as fluorine atoms are attached to the carbon atom to which sulfonyl groups are attached. The most suitable copolymeric composition comprises 30 to 90 wt.%, preferably 40 to 75 wt.% of fluorinated ethylene and 70 to 10 wt.%, preferably 60 to 25 wt.% of perfluorovinyl compounds having sulfonyl fluoride groups.

Copolymer having pendant sulfonyl groups can be prepared by conventional polymerization methods used for preparation of homopolymers or copolymers of fluorinated ethylene. These methods include polymerization in non-aqueous systems and aqueous system. Polymerization is generally conducted at 0° to 200° C. under pressure of 1 to 200 kg/cm². Non-aqueous solution polymerization is frequently carried out in a fluorinated solvent. Suitable non-aqueous solvents are inert 1,1,2-trichloro-1,2,2-trifluoroethane or perfluoro hydrocarbons such as perfluoro methyl cyclohexane, perfluoro dimethyl cyclobutane, perfluoro octane, perfluoro benzene, etc.

Aqueous solution methods for preparation of copolymers may be carried out by contacting monomers with an aqueous medium containing free radical initiators and dispersing agents to obtain a slurry of unwettable or granular polymer particles. Alternatively, monomers are contacted with an aqueous medium containing both free radical initiators and dispersing agents inert to telomerization to prepare a colloidal dispersion of polymer particles, followed by concentration of the dispersion.

After polymerization, the polymers are shaped into membranes. Conventional techniques for shaping into membranes such as by melt fabrication into thin films may be employed.

A copolymer after being shaped into a thin membrane may be reinforced with a backing such as net of reinforcing material to improve mechanical strength. Nets prepared from polytetrafluoroethylene fibers are most suitable but porous polytetrafluoroethylene sheets are also useful.

The equivalent weight of cation exchange groups in the membrane is generally from 1000 to 2000, preferably from 1000 to 1500. If desired, composite membranes comprising two bonded films, which are prepared separately so as to have different equivalent weights, may also be used. In such composite films, the thickness of the film with higher equivalent weight is preferably less than ½ the thickness of the membrane, the aforesaid backing being provided on the side of the second film with lower equivalent weight.

A thus shaped membrane of the copolymer can be contacted with gaseous or liquid anhydrous ammonia, a gaseous mixture of ammonia and air or inert gases, or liquid ammonia, as described in U.S. Pat. No. 3,784,399 to convert pendant $-CF_2CF_2SO_2F$ groups to $-CF_2CF_2SO_2NH_2$ groups. When ammonia is used in a gaseous state, the reaction is carried out at room temperature (20° to 30° C.). Liquid ammonia is applied at a temperature of $-35°$ C. or lower. Amidation proceeds from the surface into the internal portion of the membrane. The thickness of sulfonamide stratum thereby formed can freely be controlled by the time of contact with ammonia.

A membrane obtained according to the above procedures is then subjected to treatment with anion radicals according to the method of the present invention.

Anion radicals for use in the present invention can be generated from substantially any convenient source. Typical examples are Na-naphthalene, Na-benzene, Na-styrene, Na-1,2-diphenyl acetylene, Na-1,1-diphenylethylene, Na-benzophenone, Na-4,5,9,10-tetrahydro pyrene, Na-1,2,3,6,7,8-hexahydro pyrene, K-thianthrene oxide, K(or Na)-1,2-dibenzoyloxystilbene, Na-o-dibenzoyl benzene, Na-tetraphenyl ethylene, Na-diphenyl ketone, Na-1,1,3,3-tetraphenyl butene-1, Na-tetracyanquino dimethane, Na-α-methyl styrene, and so on. Among them, Na-benzene and Na-naphthalene are preferred from standpoint of ease of handling.

The reaction proceeds by attack of the generated anion radicals on sulfonamide groups. The reaction temperature differs depending on the kinds of anion radicals but anion radicals which are reactive at generally from $-80°$ C. to 200° C., preferably from 0° to 100° C., are preferred in practical operation.

Presence of oxygen causes self-decomposition of not only anion radicals but also radicals in general so that their activities are lowered. Therefore, during the reaction, oxygen is preferably excluded from the system by sufficient replacement with inert gases. While anion radical source is not particularly limited, it is convenient to employ sodium-benzene type or sodium-naphthalene type compounds, since the reaction may be carried out at approximately room temperature. The anion radical may be employed in stoichiometric amount based on the quantity of sulfonamide groups but an excess is usually employed. The solvents employed are preferably those which will swell the polymer containing sulfonamide groups but resist attack by anion radicals. Suitable solvents include, for example, solvents such as ethylene glycol dimethylether, diethyleneglycol dimethylether, tetraethyleneglycol dimethylether, tetrahydrofuran and the like. The solvent should be carefully purified and dried before it is used. If purification and drying are inadequate, there may occur partial hydrolysis of nitrile groups formed, simultaneously inducing hydrolysis of sulfonamide groups to from sulfonic acid groups. For the purpose of converting sulfonamide groups into nitrile groups with high selectivity, it is essential to purify and dry the solvent. Moreover, impurities present in the solvent may sometimes cause deactivation of anion radicals generated.

After treatment with anion radicals, the membrane is thoroughly washed with water and then subjected to hydrolysis by any conventional method to give fluorocarbon cation exchange membranes having carboxylic acid groups.

The chemical change accompanied with anion radical treatment is formation of nitrile groups, which shows absorption at 2380 cm$^{-1}$ in infrared absorption spectrum. Sulfonamide groups have absorption bands in infrared absorption spectrum at 1630 cm$^{-1}$ due to stretching vibration of

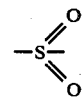

and at 3480 cm$^{-1}$ due to stretching vibration of

Both of said bands are observed to be reduced during a reaction. When the polymer treated with anion radicals is thoroughly washed and then subjected to hydrolysis, a new absorption band due to carboxylic groups is confirmed at 1690 cm$^{-1}$ in the salt form. Treatment of the salt with an acid shifts said absorption band to 1780 cm$^{-1}$.

The reaction products formed in the surface stratum of the membrane by the present method can easily be identified by staining. For example, a membrane treated with anion radicals from Na-naphthalene and hydrolyzed with an aqueous nitrous acid solution and an alkali is stained by dipping into an aqueous crystal violet solution having 5 to 10% of ethanol added therein for several minutes. The stained membrane is then observed with microscope. From, from analysis of the distribution of elements on the cross-section of the membrane by means of X-ray micro-probe analyzer, the thickness of the treated stratum as well as the density of carboxylic acid groups can be known.

The reactions according to the present method may be represented schematically as follows, as estimated from the data obtained by the analysis as mentioned above:

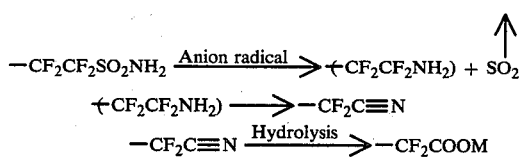

(wherein M represents an alkali metal).

The sulfonamide groups are converted to amines by anion radical treatment as represented by the equation (1). But fluorine type primary amines are very unstable and are immediately accompanied by dehydrofluorination to form nitrile groups as represented by the equation (2). The thus formed nitrile groups are to be readily converted to carboxylic acid groups by as shown in equation (3).

The novel methods according to the present invention are based on the novel reactions by anion radical treatment as shown by the equations (1) and (2).

When a membrane amidated at only one surface is treated with anion radicals, some of the sulfonamide groups may be permitted to remain in the membrane by suitable selection of reaction conditions. Thus, it is also possible to prepare a membrane wherein a small number of sulfonamide groups remain in the vicinity near the boundary between the stratum containing carboxylic acid groups and the stratum containing principally sulfonic acid groups. Such a membrane has substantially the same properties as the membrane prepared according to the method of the present invention. Usually, it is preferred to convert substantially all of sulfonamide groups to carboxylic acid groups to an extent so that absorption by infrared spectrum of sulfonamide groups is barely observable.

The methods according to the present invention are easier to operate compared with methods of prior art for preparation of membranes having carboxylic acid groups. They are free from problems in equipment and very economical.

When a cation exchange membrane prepared by the method of the present invention is used to carry out electrolysis to obtain a highly concentrated caustic soda, migration of hydroxyl ions is effectively prevented so that electrolysis at a high current density is possible.

According to a preferred embodiment of the present invention, the stratum containing carboxylic acid groups is formed only on one surface of the membrane. In case of a composite cation exchange membrane, the stratum containing carboxylic acid groups is formed only on the surface of the film with higher equivalent weight, as mentioned above. When such a membrane is reinforced with a backing, the stratum containing carboxylic acid groups is provided preferably only on the surface opposite to the side in which the backing is embedded. When the membrane is used in electrolysis, the membrane is preferably positioned so that the stratum containing carboxylic acid groups faces with the cathode side. In this manner, electric resistance is decreased to permit electrolysis at high current efficiency with decreased electric power unit.

The following non-limiting examples are given by way of illustration only.

EXAMPLE 1

Tetrafluoroethylene and perfluoro (3,6-dioxy-4-methyl-7octene sulfonyl fluoride) are copolymerized by emulsion polymerization, using ammonium persulfate as initiator and ammonium perfluorooctanoate as emulsifier, at 70° C. under a pressure of 4 atm. of tetrafluoroethylene.

The resultant polymer is washed with water and, after saponification, its exchange capacity are measured by titration method is found to be 0.92 milligram equivalent/gram-dry resin.

This copolymer is molded with heating into a film with a thickness of 0.3 mm. The film is sealed on one side with an adhesive tape made from polytetrafluoroethylene and dipped in liquid ammonia at $-50°$ C. The thickness of sulfonamide layer can be controlled by the time for dipping in ammonia. After dipping for 16 hours, the membrane is taken out and residual ammonia is removed by vacuum drying at room temperature.

The amidated membrane is then dipped in pure, dry dimethoxyethane containing naphthalene. While replacing the atmosphere in the vessel sufficiently with nitrogen gas, stirring is conducted with a caution not to destroy the membrane. A predetermined amount of finely divided metallic sodium is gradually added. After addition of sodium is completed, the reaction is continued at 60° C. overnight. The membrane is then removed and the adhesive tape peeled off, followed by washing thoroughly with fresh dimethoxyethane. Then, the membrane is washed with water and dried under vacuum. Measurement of the attenuated total reflection spectrum shows the presence the absorption band for nitrile groups at 2380 $cm^{-1}$. The membrane itself immediately after emulsion polymerization and fabrication into a film shows the broad absorption of C–F groups at 2380 $cm^{-1}$, and a nitrile group absorption band near 2380 $cm^{-1}$. Thus, both absorption bands are overlap each other.

A membrane containing the thus formed nitrile groups is dipped in an aqueous nitrous acid solution at room temperature for two days and then refluxed in 2.5 N-NaOH/50% methanol for 6 hours. Measurement of the attenuated total reflection spectrum shows a very large absorption attributable to sodium carboxylate at 1680 $cm^{-1}$. By treatment of this membrane with 1N—HCl, the absorption shifts to carboxylic acid absorption at 1780 $cm^{-1}$.

Electrolysis is carried out by means of an electrolytic cell consisting of anode and cathode chambers separated by a membrane for electrolysis with current passage area of 15 $cm^2$(5 cm × 3 cm). A dimensionally stable metal electrode is used as anode and iron plate as cathode. While circulating 3 N-aqueous sodium chloride solution at pH 3 through the anode chamber and 30% aqueous sodium hydroxide solution through the cathode chamber at 90° C., current is passed at current density of 50 ampere/$dm^2$. Current efficiency is calculated by dividing the amount of sodium hydroxide formed in the cathode chamber per hour by the theoretical amount calculated from quantity of the current passed.

When the above starting membrane immediately after molding is hydrolyzed with an aqueous sodium hydroxide solution and provided as the diaphragm for electrolysis in the electrolytic cell, the current efficiency obtained is as low as 58%. Similarly, using the same electrolytic cell as described above, in which the above amidated membrane is utilized with the amidated layer facing the cathode side, electrolysis of sodium chloride is conducted to give the current efficiency of 82%. When the membrane obtained by treating the amidated membrane with anion radical, followed by hydrolysis, is used with the carboxylic acid stratum facing the cathode side, the current efficiency is found to be 91%.

The thickness of the stratum containing carboxylic acid is about 100 microns as measured by staining and there is observed no absorption of sulfonamide groups from infrared absorption spectrum and staining.

EXAMPLE 2

The same molded membrane as used in Example 1 is employed. Amidation of the membrane is conducted similarly as in Example 1 except that the membrane is dipped in ammonia for a shorter period to obtain a sulfonamide stratum with a thickness of 60 microns. The thus obtained amidated membrane is treated with Na-naphthalene at 60° C. in tetrahydrofuran overnight, then with aqueous nitrous acid solution. It is finally saponified with 2.5 N—NaOH/50% methanol.

When electrolysis is carried out under the same conditions as in Example 1, the current efficiency of this membrane is measured at 90%.

EXAMPLE 3

Example 1 is repeated except that Na-benzene is used as the anion radical source. The membrane obtained is found to have a current efficiency of 90%.

REFERENCE EXAMPLE 1

When Example 1 is repeated except that anion radical treatment is effected in an atmosphere of the air without replacement with nitrogen gas, the absorption at 1680 $cm^{-1}$ in infra-red absorption spectrum is found at a shoulder position. When anion radicals generate under nitrogen atmosphere, the solution becomes colored in dark brown. But, in the air, the color is observed to fade quickly thus showing disappearance of anion radicals. The membrane treated with anion radicals in the air retains substantially all of sulfonamide groups as confirmed by infra-red absorption spectrum and staining.

The current efficiency of this membrane is measured under the same electrolysis conditions as in Example 1 are found to be 84%.

What we claim is:

1. A method for preparing a fluorocarbon cation exchange membrane, which comprises treating a fluorocarbon polymer membrane having at least some pendant groups of the formula: $—CF_2CF_2SO_2NH_2$ with anion radicals in an atmosphere free from oxygen and hydrolyzing the thus treated membrane.

2. A method as in claim 1, wherein the fluorocarbon polymer membrane is a reaction product obtained by the reaction of ammonia with a copolymer comprising fluorinated ethylene and a fluorocarbon vinyl ether having sulfonyl fluoride.

3. A method as in claim 1, wherein the fluorocarbon polymer membrane is prepared by the reaction of an amount of ammonia with a copolymer of fluorinated ethylene and a fluorocarbon vinyl ether having sulfonyl fluoride groups which is effective to provide $—CF_2CF_2SO_2NH_2$ groups on one surface of the membrane as surface stratum with a thickness of at least 100 A.

4. A method as in claim 1, wherein the source for generating anion radicals is a Na-benzene type or Na-naphthalene type compound.

* * * * *